United States Patent
Stephens et al.

(10) Patent No.: US 9,658,641 B2
(45) Date of Patent: May 23, 2017

(54) COSMETICALLY SELF-CENTERING REMOVABLE MODULE TRAY

(71) Applicant: Apple Inc., Cupertino, CA (US)

(72) Inventors: Gregory N. Stephens, Sunnyvale, CA (US); James B. Smith, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/500,966

(22) Filed: Sep. 29, 2014

(65) Prior Publication Data

US 2016/0093961 A1    Mar. 31, 2016

(51) Int. Cl.
*G06F 1/00* (2006.01)
*H04B 1/38* (2015.01)
*H04B 1/3816* (2015.01)

(52) U.S. Cl.
CPC ............... *G06F 1/00* (2013.01); *H04B 1/38* (2013.01); *H04B 1/3816* (2013.01)

(58) Field of Classification Search
CPC ........................ G06K 13/0831; G06K 13/08
See application file for complete search history.

(56) References Cited

U.S. PATENT DOCUMENTS

| | | | | |
|---|---|---|---|---|
| 5,655,917 A * | 8/1997 | Kaneshige | ............. | G06K 13/08 439/155 |
| 7,066,748 B2 * | 6/2006 | Bricaud | ................. | G06K 13/08 439/159 |
| 7,363,634 B2 * | 4/2008 | Lin | ....................... | G11B 17/056 720/609 |
| 7,458,857 B2 | 12/2008 | Lin et al. | | |
| 7,568,928 B2 * | 8/2009 | Hou | .................... | H01R 13/2442 439/188 |
| 7,837,486 B2 * | 11/2010 | Li | ........................ | H01R 13/635 439/159 |
| 7,865,210 B2 * | 1/2011 | Wang | .................... | H04M 1/026 439/153 |
| 8,100,722 B2 * | 1/2012 | Hu | ....................... | G06K 7/0021 439/352 |
| 8,145,261 B2 * | 3/2012 | Wang | .................... | H04M 1/026 439/153 |
| 8,147,262 B1 * | 4/2012 | Su | ...................... | G06K 13/0825 439/159 |
| 8,150,466 B2 * | 4/2012 | Park | ..................... | G06K 7/0021 361/600 |

(Continued)

FOREIGN PATENT DOCUMENTS

JP        2013535151        9/2013

OTHER PUBLICATIONS

PCT Application No. PCT/US2014/059926—International Search Report and Written Opinion dated Jun. 15, 2015.

*Primary Examiner* — Ross Gushi
(74) *Attorney, Agent, or Firm* — Downey Brand LLP

(57) ABSTRACT

This application relates to methods and apparatus pertaining to a SIM tray that includes a deformable portion. When the SIM tray is subjected to stresses that result from tolerance stacking, the deformable portion accommodates the differences tolerance errors by allowing the non-deformable portion of the SIM tray to move substantially independently from one another. Creating the deformable portion can be accomplished by utilizing materials with lower relative moduli of elasticity, dovetails, magnets, or other means.

18 Claims, 9 Drawing Sheets

(56) References Cited

U.S. PATENT DOCUMENTS

| | | | | |
|---|---|---|---|---|
| 8,292,642 B1* | 10/2012 | Lee | G06K 7/0026 | 439/159 |
| 8,371,865 B1* | 2/2013 | Su | G06K 13/0862 | 439/155 |
| 8,371,866 B1* | 2/2013 | Su | G06K 13/0862 | 439/159 |
| 8,376,764 B1* | 2/2013 | Su | G06K 13/0831 | 439/157 |
| 8,393,909 B1* | 3/2013 | Lai | G06K 13/0831 | 439/159 |
| 8,432,682 B2* | 4/2013 | Quan | G06K 13/0825 | 361/679.38 |
| 8,460,019 B2* | 6/2013 | Lai | G06K 13/08 | 439/159 |
| 8,462,514 B2* | 6/2013 | Myers | G06K 13/08 | 361/754 |
| 8,553,419 B2* | 10/2013 | Luo | G06K 13/0825 | 312/120 |
| 8,591,240 B2* | 11/2013 | Jenks | G11B 17/00 | 439/159 |
| 8,672,229 B2* | 3/2014 | Pesonen | H04B 1/3816 | 235/486 |
| 8,730,680 B2* | 5/2014 | Tang | G06K 13/0825 | 361/737 |
| 8,734,188 B2* | 5/2014 | Nakase | H04M 1/026 | 439/159 |
| 8,740,635 B2* | 6/2014 | Lim | G06K 13/08 | 439/159 |
| 8,747,131 B2* | 6/2014 | Nakase | G06K 13/0831 | 439/159 |
| 8,777,669 B2* | 7/2014 | Hu | H01R 12/714 | 439/159 |
| 8,801,468 B2* | 8/2014 | Gao | G06K 7/0021 | 439/630 |
| 8,902,609 B2* | 12/2014 | Duan | G06K 13/0831 | 361/727 |
| 8,960,818 B2* | 2/2015 | Myers | G06K 13/08 | 312/319.2 |
| 8,976,521 B2* | 3/2015 | Liu | G06K 7/0021 | 361/679.38 |
| 9,048,594 B2* | 6/2015 | Lim | H01R 27/00 | |
| 9,077,109 B1* | 7/2015 | Lin | G06K 13/0812 | |
| 9,083,438 B2* | 7/2015 | Tsai | G06K 7/0069 | |
| 9,118,140 B2* | 8/2015 | Chang | H01R 13/46 | |
| 9,124,042 B2* | 9/2015 | Matsunaga | H01R 13/74 | |
| 9,125,316 B2* | 9/2015 | Hsu | H05K 7/1417 | |
| 9,135,944 B2* | 9/2015 | Jenks | G11B 17/00 | |
| 2004/0190386 A1* | 9/2004 | Nakakubo | G06K 19/07741 | 369/30.03 |
| 2005/0124191 A1* | 6/2005 | Stanton | H04M 1/0274 | 439/135 |
| 2006/0073848 A1* | 4/2006 | Kwon | H01Q 1/084 | 455/558 |
| 2006/0231619 A1* | 10/2006 | Lee | G06K 13/08 | 235/441 |
| 2006/0274511 A1* | 12/2006 | Choi | G06K 13/08 | 361/754 |
| 2009/0023319 A1* | 1/2009 | Hou | H01R 13/2442 | 439/159 |
| 2009/0047835 A1* | 2/2009 | Lin | G06K 13/0831 | 439/632 |
| 2009/0267677 A1* | 10/2009 | Myers | G06K 13/08 | 327/356 |
| 2011/0255252 A1* | 10/2011 | Sloey | H04B 1/3816 | 361/752 |
| 2012/0162925 A1* | 6/2012 | Luo | G06K 13/0831 | 361/727 |
| 2012/0276780 A1* | 11/2012 | Hu | H01R 12/714 | 439/630 |
| 2012/0307451 A1* | 12/2012 | Shukla | G06F 1/1658 | 361/699 |
| 2013/0089998 A1 | 4/2013 | Chen et al. | | |
| 2013/0267106 A1 | 10/2013 | Jenks | | |
| 2013/0286554 A1* | 10/2013 | Heiskanen | G06K 7/0021 | 361/679.01 |
| 2013/0300272 A1* | 11/2013 | Myers | G06K 13/08 | 312/319.2 |
| 2013/0309885 A1* | 11/2013 | Liu | H01R 13/629 | 439/153 |
| 2013/0314854 A1* | 11/2013 | Chung | H05K 5/0239 | 361/679.01 |
| 2013/0334948 A1* | 12/2013 | Chung | H05K 7/1461 | 312/333 |
| 2014/0002971 A1* | 1/2014 | Chung | H05K 5/0286 | 361/679.01 |
| 2014/0029211 A1* | 1/2014 | Gao | H05K 5/0091 | 361/747 |
| 2014/0078660 A1 | 3/2014 | Dondzik et al. | | |
| 2014/0154926 A1* | 6/2014 | Cao | G06K 7/04 | 439/634 |
| 2014/0247567 A1* | 9/2014 | Wang | H04M 1/026 | 361/754 |
| 2014/0307372 A1* | 10/2014 | Shukla | G06F 1/1658 | 361/679.01 |
| 2014/0315404 A1* | 10/2014 | Wang | G06K 13/08 | 439/159 |
| 2014/0362548 A1* | 12/2014 | Liu | G06F 1/16 | 361/754 |
| 2015/0011118 A1* | 1/2015 | Matsunaga | H01R 13/15 | 439/527 |
| 2015/0022981 A1* | 1/2015 | Tan | G06K 7/0021 | 361/756 |
| 2015/0072549 A1* | 3/2015 | Okoshi | H01R 13/633 | 439/160 |
| 2015/0079847 A1* | 3/2015 | Liu | H01R 12/721 | 439/630 |
| 2015/0155651 A1* | 6/2015 | Ejiri | H01R 13/5213 | 439/521 |
| 2015/0207270 A1* | 7/2015 | Zhang | G06K 13/0831 | 439/159 |
| 2015/0207284 A1* | 7/2015 | Liu | G06K 7/0052 | 439/218 |

* cited by examiner

COSMETICALLY SELF-CENTERING REMOVABLE MODULE TRAY

FIELD

This paper describes various embodiments that relate to mobile telephony devices such as a mobile telephone. More specifically, a user accessible tray that allows users to swap out components such as a subscriber identification module (SIM) card is described.

BACKGROUND

Subscriber identification module (SIM) cards are generally removable cards for mobile devices that include integrated circuits that store subscriber information for the mobile devices. SIM cards are typically supported within a mobile device by a user accessible tray, which typically slides in and out of the mobile device. The user accessible tray should perform two essential functions: (1) facilitate easy access and removal of the SIM card, and (2) when inserted into a mobile device, maintain a seamless external cosmetic appearance in relation to a housing of the mobile device. However, SIM trays can be prone to deformation once inserted into a mobile device as a result of a phenomenon known in the art as tolerance stacking. When tolerance stacking causes a substantial misalignment between an external opening in the mobile device and internal connectors configured to mate with the SIM card, the user accessible tray can be subjected to substantial stresses. As a result, the user accessible tray can deform, which can make it more difficult for the user to remove the tray. In some cases, misalignment of internal and external features can cause an external portion of the SIM tray to deform in a way that prevents the external portion from matching a surrounding exterior surface of the housing of the mobile device, thereby marring an external cosmetic appearance of the mobile device.

SUMMARY

This paper describes various embodiments that relate to methods and apparatus for cosmetically aligning a subscriber identification module (SIM) tray with a SIM tray opening of a portable electronic device.

A subscriber information module (SIM) tray assembly is disclosed that is utilized with a portable electronic device. The SIM tray assembly can include an external portion designed to cover an opening in a housing of the portable electronic device. The opening can take the form of a slot for the SIM tray. The SIM tray assembly can also include a tray portion designed to hold a SIM card with an opening disposed on the SIM tray assembly. The SIM tray assembly also includes a compliant part forming a joint between the tray portion and the external portion. The compliant part can adjust for tolerances between internal and external features of the portable electronic device.

A subscriber information module (SIM) tray is disclosed that can include an external portion and a tray portion. The external portion can cover a SIM slot of a mobile device. The tray portion can include an opening configured to hold a SIM card. The SIM tray can also include an interface located between the tray portion and the external portion. The interface can constrain relative movement between the external portion and the tray portion in a first direction parallel to a surface of the tray portion that is configured to hold the SIM card while also facilitating movement between the external portion and the tray portion in a second direction perpendicular to the first direction.

A mobile device is disclosed that includes a housing forming an interior volume, a slot defined by the housing that allows access to the interior volume from outside the housing and an electrical components positioned within the interior volume that includes a number of electrical components. A subscriber identification module (SIM) tray assembly is inserted into the slot so that a SIM card supported by the SIM tray assembly contacts the of electrical contacts. The SIM tray assembly includes at least the following: an external portion that covers the slot of the mobile device and sits flush with an exterior surface the housing; a tray portion that supports the SIM card; and a flexible region connecting the external portion to the tray portion, the flexible region configured to allows the tray portion to shift with respect to the external portion to accommodate manufacturing tolerances that cause an offset between a location of the slot and a location of the plurality of electrical contacts.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
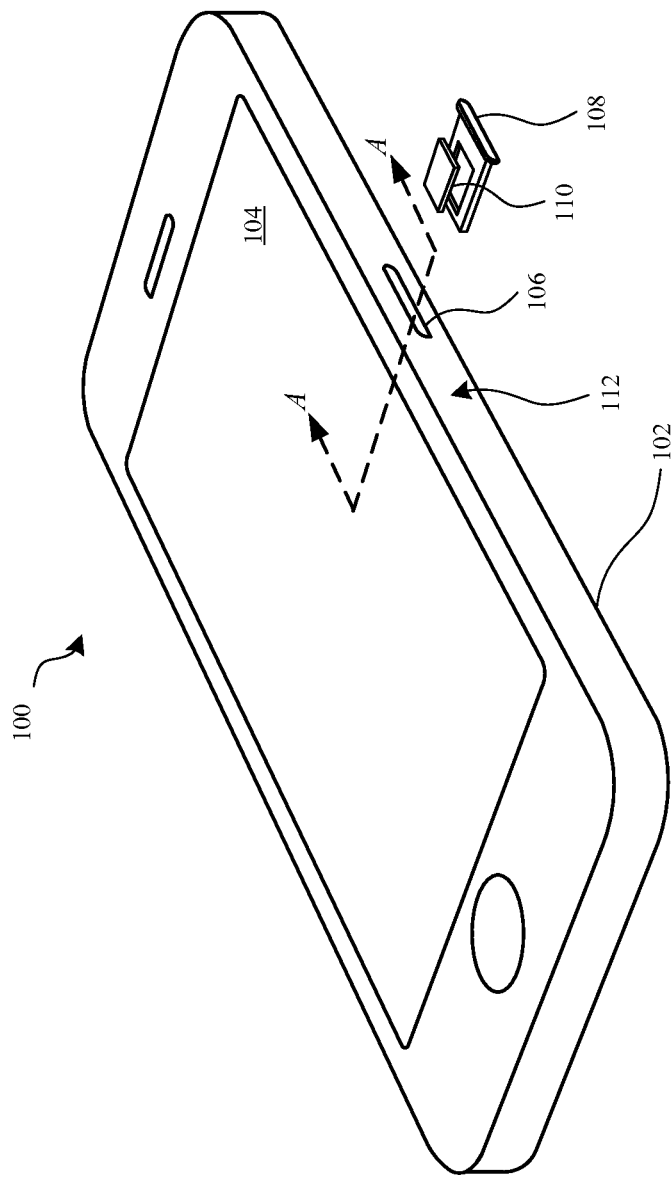
FIG. 1 shows a perspective view of an illustrative mobile device suitable for use with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

A subscriber identification module (SIM) card is an integrated circuit that securely stores service and subscriber information used to identify the subscriber on mobile telephony devices, such as a mobile telephone. A SIM tray is a user accessible tray utilized in mobile telephony devices that is adapted to receive and secure the SIM card within the mobile device. A SIM tray generally includes a tray portion that supports the SIM card rigidly joined to an external portion that covers an opening in a housing of the mobile device. The SIM tray should perform two essential functions: (1) facilitate easy access and removal of the SIM card, and (2) when inserted into a mobile device, maintain a seamless external cosmetic appearance in relation to a housing of the mobile device. However, SIM trays can be prone to deformation once inserted into a mobile device as a result of manufacturing tolerances in both the opening that facilitates insertion of the SIM tray and the positioning and dimensioning of internal components configured to support and mate with the SIM card. These manufacturing tolerances can generate offsets that cause the rigid coupling between the tray portion and the external portion to experience substantial stresses. Because the tray portion of the SIM tray is engaged by internal coupling features that align and position the SIM card with respect to internal connectors, when the external portion of the SIM tray contacts the surfaces forming the opening, the external portion is forced to deform to accommodate any offsets causing misalignment between the opening and the internal components. Accordingly, deformation of the external portion of the SIM tray can cause the external portion of the SIM tray to deviate relative to the housing, thereby adversely affecting the external cosmetic appearance between the SIM tray and the housing of the mobile device.

Moreover, the aforementioned bending of the SIM tray can increase the stress and strain applied to the internal electrical components of the mobile device. Consequently, electrical contacts between the SIM card and the internal electrical components can be damaged due the SIM tray bending. Furthermore, over time the SIM tray can become permanently bent or in severe cases break from being subjected to the constant stress and strain. As a result, binding can develop between the housing of the mobile device and the SIM tray during removal of the SIM tray. These limitations may be remedied by reducing manufacturing tolerances of the parts; unfortunately, such machinery can be substantially more expensive and in some cases can substantially increase an amount of time spent to produce the part and/or the device due to processes associated with the higher precision manufacturing operations.

One solution to the aforementioned problem is to build a compliant portion into a SIM tray assembly that joins the external portion to the tray portion. The compliant portion can be designed to accommodate both the internal and external manufacturing tolerance ranges associated with the mobile device. The compliant portion of the SIM tray assembly allows the external portion of the SIM tray to shift or deflect with respect to the tray portion without adversely affecting other portions of the SIM tray assembly. Moreover, the compliant portion of the SIM tray can allow the tray portion of the SIM tray to move independently of an external portion of the SIM tray. In this way, substantial tolerance mismatches of components contacting the tray portion of the SIM tray will not adversely affect the external portion.

In some embodiments, the compliant portion can take the form of an elastomeric polymer that forms an interface between the internal and external portions of the SIM tray. In such a configuration, the elastomeric polymer acts as a point of deflection once the SIM tray is fully inserted into the mobile device. Once inserted, the tray portion of the SIM tray is free to travel within the mobile device as a result of the interface being flexible. Moreover, the external portion of the SIM tray can remain fixed and unaffected from movement of the tray portion. Alternatively, the compliant portion can take the form of a series of interlocking features that form an interface between the internal and external portions of the SIM tray. Furthermore, the series of interlocking features can decouple horizontal movement of the tray portion from the external portion. In this way, the tray portion of the SIM tray does not have to deflect in order to interact with the internal electrical components but instead can translate into a proper position. In some embodiments, the compliant portion can include a series of magnets that form the interface between the internal and external portions of the SIM tray. The magnetic coupling permits self-alignment of the external portion of the SIM tray with the opening in the housing without exerting any continuous force upon the tray portion of the SIM tray.

In some embodiments, the SIM tray can be machined or formed from a single piece of material and an interface between the tray portion and the external portion is optimized by removing material from the interface until a desired balance between flexibility and structural integrity is achieved at the interface. The material can be removed in any number of ways and in any number of patterns. For example, in some embodiments, a number of holes can be drilled at the interface. In other embodiments, a unitary opening can be formed to achieve the desired balance. In this way, the flexible interface joining the tray portion to the external portion can allow deflection of the external portion without substantially affecting the rigid region of the tray portion supporting the SIM card.

These and other embodiments are discussed below with reference to FIGS. 1-8; however, those skilled in the art will readily appreciate that the detailed description given herein with respect to these figures is for explanatory purposes only and should not be construed as limiting.

FIG. 1A shows a perspective view of an illustrative mobile device suitable for use with the described embodiments. In some embodiments, mobile device 100 can be a mobile telephony device along the lines of a mobile telephone. Mobile device 100 can include housing 102 that creates an internal volume for positioning and protecting a number of electronic components that include at least circuitry for supporting display 104. Housing 102 can also take the form of multiple housing components that cooperate to define the internal volume for positioning and protecting the electronic components. Housing 102 can also include an opening, which can take the form of slot 106 for receiving, positioning, and protecting SIM tray 108. SIM tray 108 is a user accessible tray utilized by mobile device 100 to secure SIM card 110. For example, SIM tray 108 can include an opening for accommodating and supporting SIM card 110 while leaving a substantial portion of a bottom surface of SIM card 110 exposed so that electrical contacts on SIM card 110 can mate with electrical contacts of mobile device 100. SIM card 110 is an integrated circuit that securely stores service and subscriber information used to identify the subscriber on mobile devices. When SIM tray 108 is inserted into slot 106, SIM tray 108 is positioned in such a manner that allows SIM card 110 to interact with the electronic components in housing 102. SIM tray 108 can be positioned by housing 102 or electronic components located in the interior volume of housing 102. Additionally, when SIM tray 108 is inserted into housing 102, an exterior portion of SIM tray 108 that is exposed to the exterior of housing 102 can be substantially flush or parallel with external surface 112 of housing 102. When the exterior portion of SIM tray 108 is substantially flush or parallel to exterior surface 112 a desirable cosmetic appearance can be achieved.

Figure 2A:
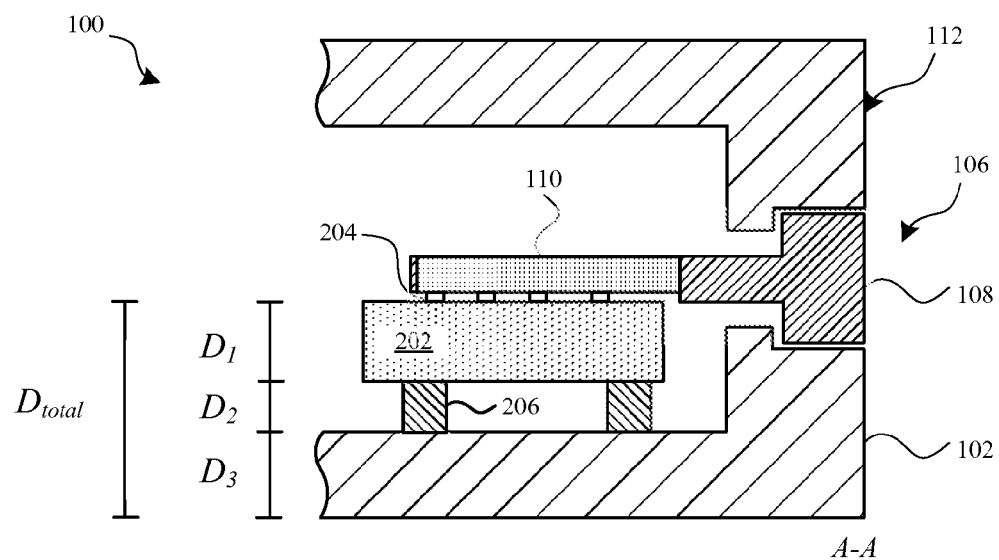
FIG. 2A shows a cross-sectional view of the mobile device in accordance with section line A-A of FIG. 1.

FIG. 2A shows a cross-sectional view of mobile device 100 in accordance with section line A-A of FIG. 1 with SIM tray 108 placed within slot 106 in housing 102 of mobile device 100. As depicted, SIM tray 108 is fully inserted within slot 106. SIM tray 108 is depicted in an ideal position causing the external portion of SIM tray 108 to be substantially flush or parallel to surface 112. Housing 102 can include chamfers or guiding features that aid in positioning SIM tray 108 as it slides into slot 106. When inserted into mobile device 100, SIM tray 108 is positioned in such a manner that allows SIM card 110, placed within the receptacle in SIM tray 108 which places SIM card 110 just above electrical component 202 so that SIM card 110 can interact with electrical contacts 204. In some embodiments, electrical component 202 can be a main logic board (MLB).

Electrical component 202 occupies a height $D_1$ within mobile device 100. In some embodiments, electrical component 202 can be a main logic board (MLB). Standoffs 206 occupy a height $D_2$ and can support electrical component 202 above an interior surface of housing 102. The interior surface of housing 102 is defined by a housing wall, which has a thickness $D_3$. In the case where contacts 204 form a substantially flat surface, SIM tray 108 is positioned substantially parallel to a top surface of electrical component 202 once inserted into mobile device 100. The sum of $D_1$, $D_2$, and $D_3$ can be equal to a distance $D_{total}$. $D_{total}$ can be critical in a design such as a position of slot 106 in housing 102 in order to position SIM tray 108 and assure that SIM tray 108 remains substantially flush or parallel to surface 112 advantageously creating a desirable cosmetic appearance. Designers can take into account $D_{total}$ to achieve the desirable cosmetic appearance or other design goals.

Figure 2B:
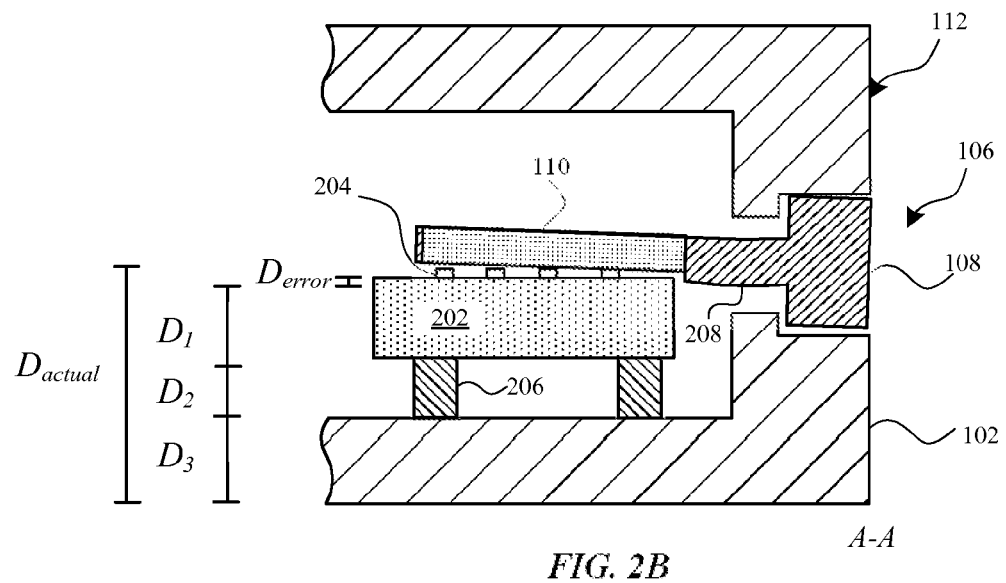
FIG. 2B shows a cross-sectional view of the mobile device in accordance with section line A-A of FIG. 1.

FIG. 2B shows a cross-sectional view of mobile device 100 in accordance with section line A-A of FIG. 1 where internal components of device 100 are out of position as a result of tolerance stacking. Tolerance stacking occurs when a number of manufactured component suffer dimensional defects. Tolerance stacking is a phenomenon that occurs when the manufactured components are manufactured at the maximum allowable dimensions and the component variations sum or "stack" together to cause design defects such as clearance issues. In many cases, tolerance stacking can be difficult to control and be an unavoidable aspect of the manufacturing of multiple identical or similar parts. Electrical component 202, housing 102, and standoffs 206 can be manufactured components. Therefore, Electrical component 202, housing 102, and standoffs 206 can be subject to tolerance stacking. The sum of the actual heights of electrical component 202, housing 102, and standoff 206, $D_{actual}$, can be substantially greater than the designed sum of components heights $D_{Total}$. The difference between $D_{actual}$ and heights $D_1$, $D_2$, and $D_3$ can be $D_{ERROR}$. In some cases, $D_{ERROR}$ may not be taken into account by designers in positioning slot 106. As a result, stress can be concentrated at interface 208 which can cause SIM tray 108 to bend. Consequently, SIM tray 108 will no longer be substantially parallel to surface 112 or electrical component 202. In some embodiments, communication between SIM card 110 and electrical component traces 204 can be substantially inhibited. Additionally, mobile device 100 may malfunction due to a miscommunication between SIM card 110 and electrical component 202 as a result of SIM tray 108 not being substantially parallel to surface 112. Moreover, tolerance stacking can create substantial stress and strain, such as stress concentrations at interface 208, thereby causing SIM tray 108 to elastically deform or even structurally fail. Further, tolerance stacking can cause tray 108 to no longer remain substantially flush or parallel to surface 112 causing the exterior of mobile device 100 to no longer be aesthetically appealing. In some embodiments, both the external portion of SIM tray 108 and the tray portion can deflect and be biased out of position as a result of severe cases of tolerance stacking. In some cases, deformation of the external portion can cause the external portion to protrude away from an exterior surface of the mobile device, which could cause the external portion to catch on external objects, potentially causing damage to mobile device 100.

Figure 3A:
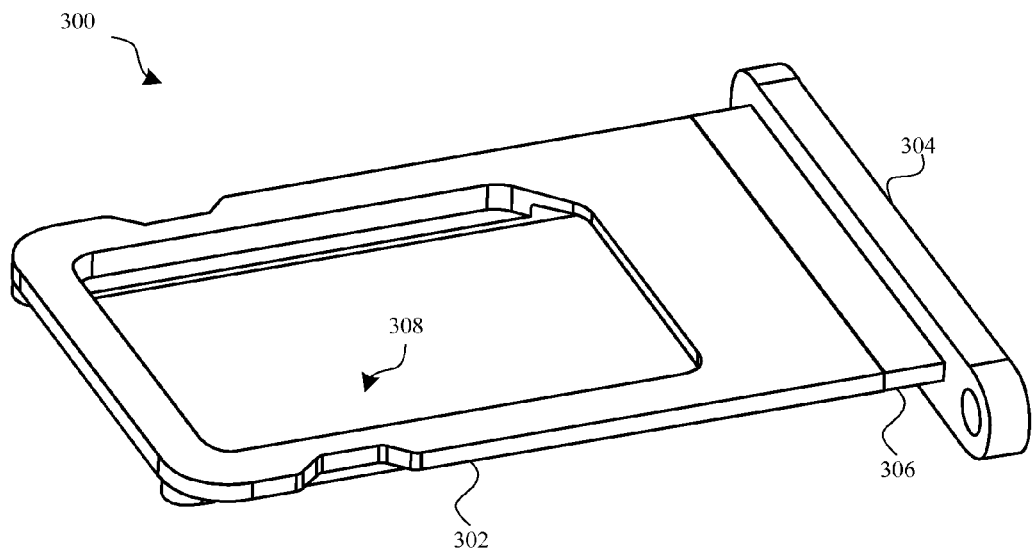
FIG. 3A shows a perspective view of a composite SIM tray assembly.
Figure 3B:
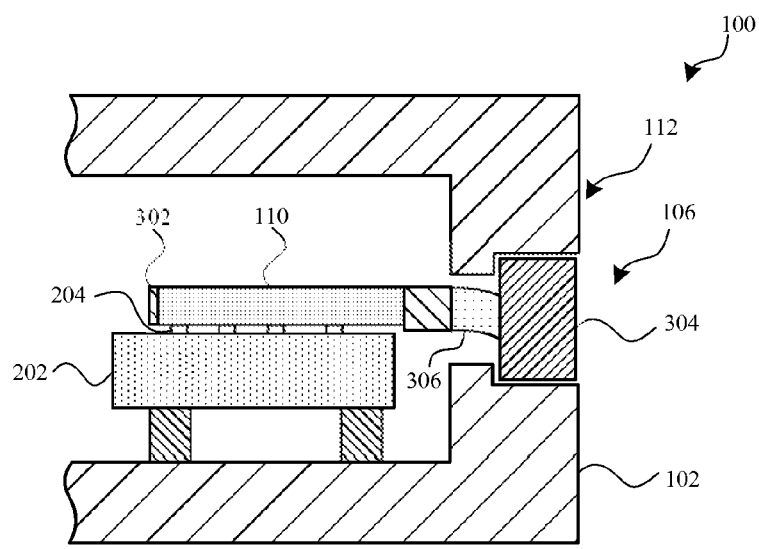
FIG. 3B shows a cross-sectional view of the mobile device utilizing the composite SIM tray assembly in accordance with section line A-A of FIG. 1.

FIG. 3A shows an isometric view of SIM tray assembly 300 in accordance with some embodiments. In some embodiments, SIM tray assembly 300 can include tray portion 302, external portion 304, and flexible portion 306. Tray portion 302 can include receptacle 308 that is utilized to hold a SIM card such as SIM card 110. Tray portion 302, external portion 304, and flexible portion 306 can be formed from different materials. Flexible portion 306 can form an interface between tray portion 302 and external portion 304. In some embodiments, flexible portion 306 can be adhesively coupled to tray portion 302 and external portion 304. In some embodiments, flexible portion 306 can be formed from a material with a lower relative modulus of elasticity than the modulus of elasticity of the materials used to form tray portion 302 and external portion 304. For example, tray portion 302 and external portion 304 can be made from a metal such as aluminum or steel. In other embodiments, tray portion 302 can be made from a polymer. While tolerance stacking can still cause stress concentrations to be applied along flexible portion 306, flexible portion 306 can dissipate the stress by flexing to dissipate the applied stresses. While flexible portion 306 isn't infinitely stretchable it can be designed to accommodate an amount of stress expected from tolerance stacking To illustrate, FIG. 3B shows a cross-sectional view of mobile device 100 utilizing SIM tray assembly 300 in accordance with section line A-A of FIG. 1. In some embodiments, external portion 304 can fit tightly within slot 106 of housing 102, thereby inhibiting containments from entering the interior of housing 102. In some embodiments, external portion 304 can utilize a rubber gasket located at an interface between external portion 304 and housing 102 to more substantially prevent continents from entering the interior of housing 102 through slot 106. SIM tray assembly 300 can be utilized to accommodate tolerance stacking of internal components of mobile device 100. For example, SIM tray assembly 300 can be inserted into mobile device 100 in the same manner as SIM tray 108. In this particular embodiment, tolerance stacking can cause a stress concentration to form at flexible portion 306. Flexible portion 306 can be formed from various durometers of rubber, elastomeric polymers, silicon, or any suitable material with a lower modulus of elasticity than the material that forms tray portion 302 and/or external portion. As a result, flexible portion 306 can deform by a greater magnitude than tray portion 302 and/or external portion 304 for a given stress. Therefore, when subjected to a tolerance stacking phenomenon, flexible portion 306 may bend, deform or comply by a greater magnitude than tray portion 302 and external portion 304. As a result, tray portion 302 and external portion 304 can bend, deform, or comply by a substantially lower magnitude relative to flexible portion 306. Therefore, tray portion 302 and electrical component 202 may remain substantially parallel to each other. In this way, tray portion 302 is not adversely affected by tolerance stacking and communication between SIM card 110 and electrical component 202 can be maintained. Additionally, flexible portion 306 can be utilized to maintain a smooth interface between external portion 304 and housing 102. In this way, tolerance stacking may allow external portion 304 to be flush with surface 112 thereby providing an aesthetically appealing exterior for mobile device.

Figure 4A:
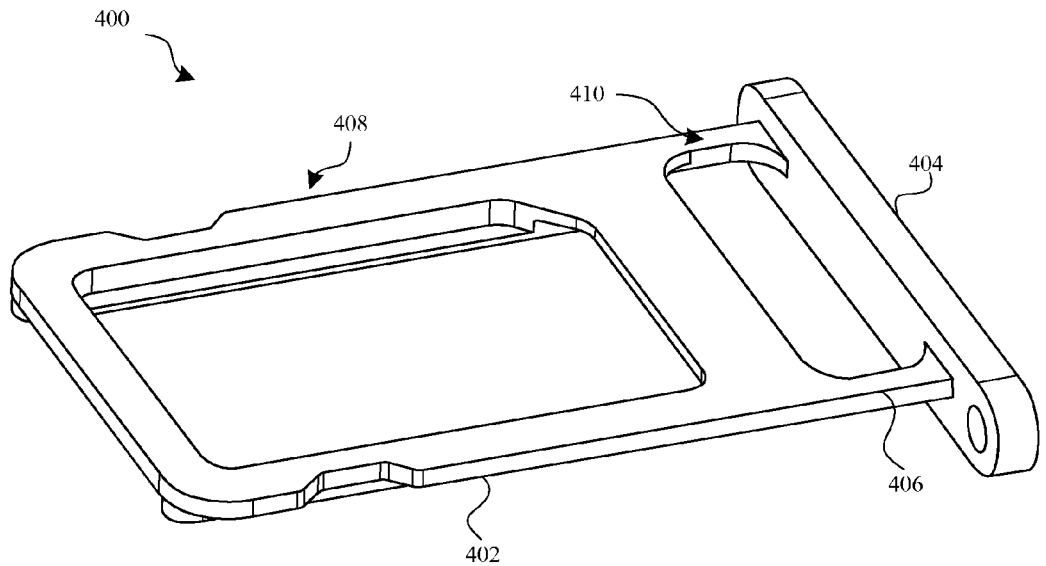
FIG. 4A shows an isometric view of various illustrative embodiments of a SIM tray.

FIG. 4A shows an isometric view of various illustrative embodiments of SIM tray 400. SIM tray 400 can be monolithic and formed from a single material such as a polymer, aluminum, steel, or any material that can be cut, machined, and/or molded. SIM assembly 400 can include tray portion 402 and external portion 404. Moreover, tray portion 402 can include flexible region 406 and rigid region 408. Rigid region 408 can support a SIM card such as SIM card 110. Flexible region 406 can include one or more openings which define a number of arms 410. Thus, 402 remains attached to external portion 404 via arms 410. In some embodiments material can be removed from both top and lateral surfaces of flexible region 406 to increase flexibility of flexible region 406. As more material is removed from flexible region 406, an amount of force required to bend flexible region 406 is reduced, thereby reducing an amount of stress endured by SIM tray 400 when inserted within a mobile device. Although flexible region 406 and rigid region 408 are formed from the same material, flexible region 406 can deform by a greater magnitude for a given stress than rigid region 408. Tolerance stacking can cause stress concentrations to form at flexible region 406 and create a potential weak point on SIM tray 400. Flexible region 406 is designed to compensate for this stress concentration and alleviate problems associated with the stress concentrations.

Figure 4B:
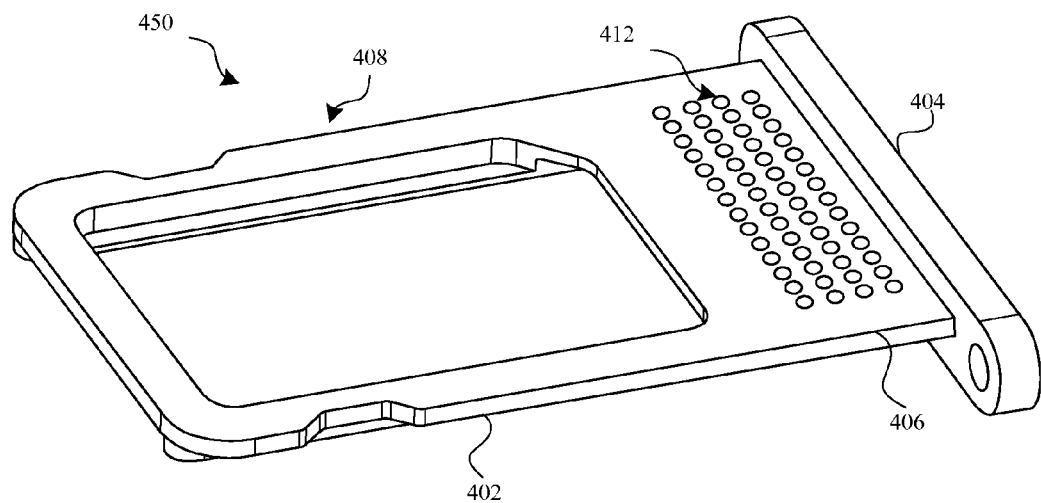
FIG. 4B, shows an isometric view of various illustrative embodiments of a SIM tray.

As shown in FIG. 4B, flexible region 406 can also take the form of series of holes 412 in SIM tray 450. SIM tray 450 can have tray portion 402 and external portion 404. Tray portion can include a rigid region 408 capable of receiving a SIM card and flexible region 406, capable of deforming by a greater magnitude for a given stress than one or both of rigid region 408 and external portion 404. Deforming by a greater magnitude for a given stress can be achieved by removing material from flexible region 406 such as the removal of material accomplished by series of holes 412. Holes 412 can take many forms depending on the desired flexibility of SIM tray 450 and other manufacturing considerations. For example, drilling a quantity of large diameter holes may result in the same deformation for a given stress as a larger quantity of small diameter holes. In this way, a desired balance between flexibility and structural integrity can be achieve while manufacturing expenses can be substantially reduced. In some embodiments, holes 412 can include many small holes as shown in FIG. 4B. Small holes may be desirable to achieve a more precise flexibility to structural integrity ratio, which could not be achieved using large cumbersome drills. Each additional small hole can incrementally increase a flexibility of flexible region 406. Furthermore, tray portion 402 made from certain materials, such as a hard plastic, may be susceptible to cracking. Therefore, it may be desirable to use fewer, and further spaced series of holes 412 to avoid cracking flexible region 406.

Figure 5:
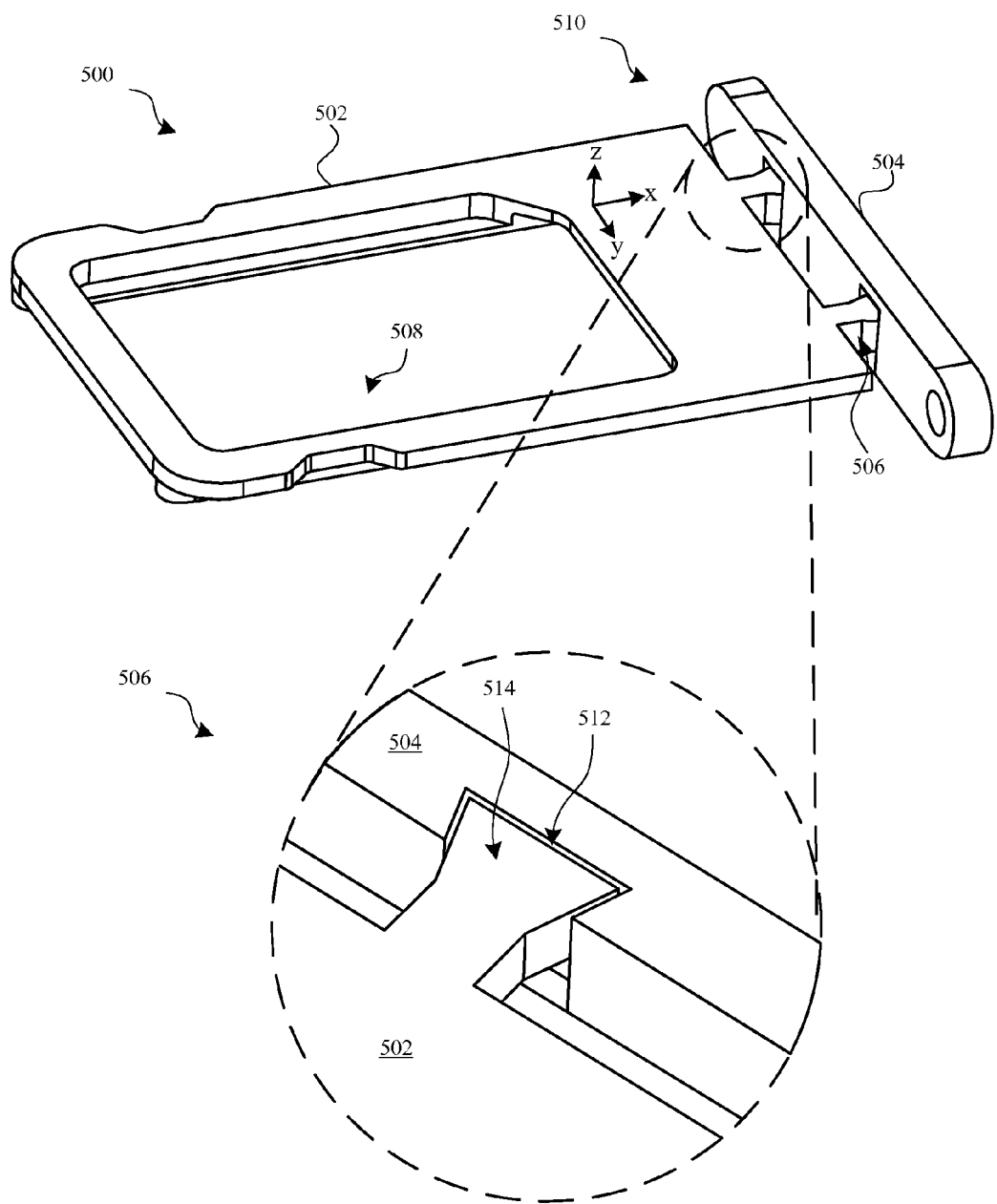
FIG. 5 shows an isometric view of a dovetailed SIM tray assembly.

FIG. 5 shows an isometric view of dovetailed SIM tray assembly 500. SIM tray assembly 500 can be utilized in mobile device 100. In some embodiments, SIM tray assembly 500 can include tray portion 502 and external portion 504. FIG. 5 also shows a close up view depicting a dovetail feature that can form an interface between tray portion 302 and external portion 304. Tray portion 502 can join to external portion 504 by utilizing joints 506. Tray portion 502 can also join external portion 504 by utilizing a number of joints. Joint 506 can substantially limit movement of tray portion 502 and external portion 504 relative to each other in x and y directions. However, joint 506 can allow the positions of tray portion 502 and external portion 504 to float relative to each other in z direction. Freedom of movement between tray portion 502 and external portion 504 would be desirable in the event that stress concentrations would form at region 510, a potential weak point of SIM tray assembly 500. For example, region 510 could be analogous to stress concentrations at interface 208 depicted in FIG. 2. In some embodiments, external portion 504 can further comprise a rubber gasket.

FIG. 5 also shows a close up view showing a particular joint 506. External portion 504 can include channel 512 defined by an interior facing surface of external portion 504. Channel 512 can take the form of a square, rectangular, or curved slot. Tray portion can include protrusion 514 integrally formed within the tray portion. Protrusion can be adapted for insertion into channel 512. Channel 512 can be shaped to accept protrusion 514 and trap a distal end of protrusion 514 within channel 512. For example, a trapezoidal or fan shape can facilitate insertion in a direction but resist removal in a different direction. Channel 512 and protrusion 514 can cooperate to form joint 506 which can take the form of a tight interlocking joint that can be rigid in x and y directions but not in z direction. In some embodiments, channel 512 can be oriented in a direction to allow movement of the external portion 504 in the direction. Tray portion 502 can include receptacle 508 that is utilized to hold a SIM card. A lubricant or a coating that increases lubricity can facilitate movement in z direction.

SIM tray assembly 500 can also be utilized to accommodate tolerance stacking of internal components of mobile device 100. For example, SIM tray assemblies 400 and 450 can be inserted into mobile device 100 in the same manner as SIM tray 108. In this particular embodiment, tolerance stacking can cause a stress concentration to form at region 510. However, joint 506 can allow external portion 504 and tray portion 502 to translate relative to each other in the z direction to dissipate any stress concentration resulting from the tolerance stacking. Rather than deforming, joint 506 allows tray portion to translate by movement of protrusion

514 within channel 512. Likewise, external portion can also translate in z direction. In this way, tray portion 502 is not adversely affected by tolerance stacking and communication between SIM card 110 and electrical component 202 can be maintained. Additionally, external portion 304 can be flush with surface 112 providing an aesthetically appealing exterior for mobile device.

Figure 6:
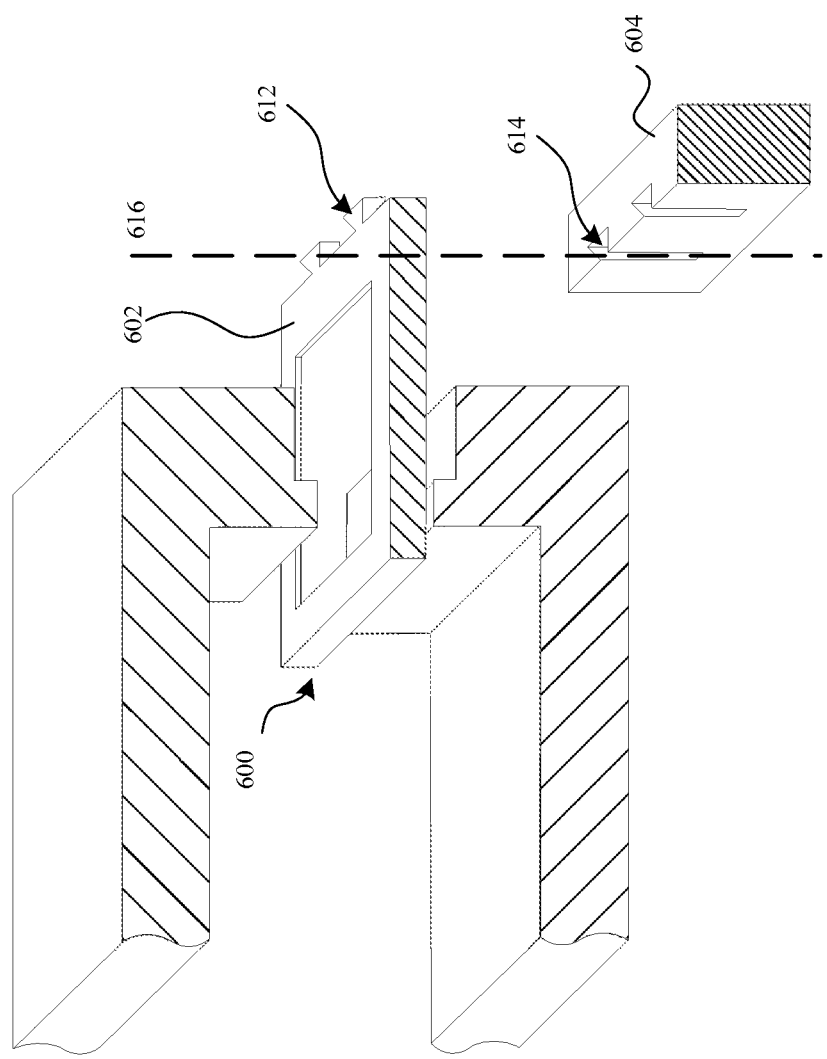
FIG. 6 shows an exploded view illustrating an embodiment of a SIM tray assembly.

To illustrate, FIG. 6 depicts an exploded perspective view of a specific implementation of SIM tray 600 utilizing a dovetail joint. SIM tray 600 includes tray portion 602 including mortise 612 and external portion 604 including tenon 614. Tenon 614 can join to mortise 612 along axis 616 in order to form a dovetail joint. As depicted, tenon 614 can translate along axis 616 relative to external portion 604 according slot of mortise 612. However, relative movement between tray portion 602 and external portion 604 in directions perpendicular to axis 616 is substantially limited by the cooperation of tenon 614 and mortise 612.

Figure 7A:
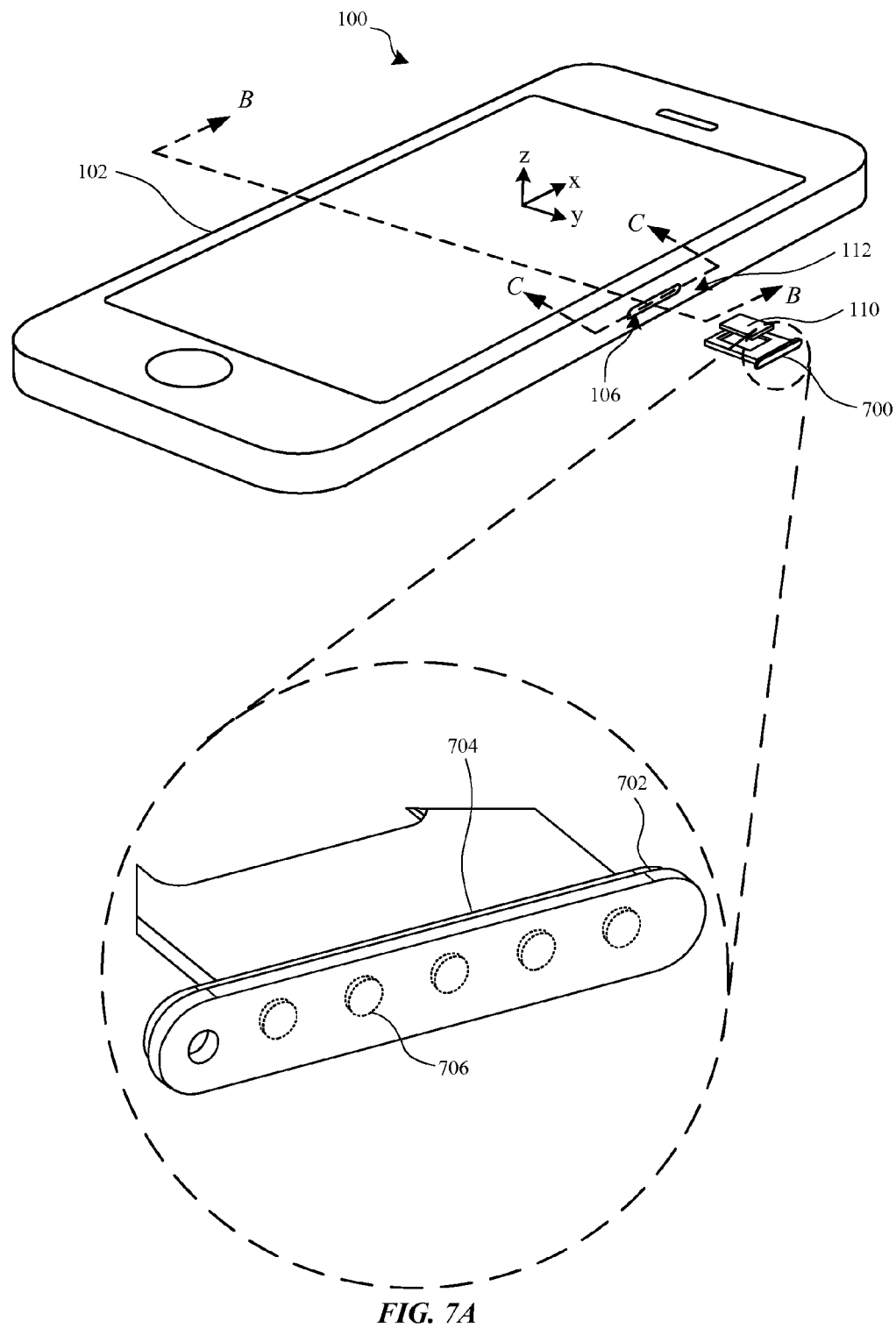
FIG. 7A shows a perspective view of a mobile device suitable for use with the described embodiments and a close up view of the SIM tray.

FIG. 7A depicts a perspective view of illustrative mobile device 100 suitable for use with the described embodiments and a close up view SIM tray 700. Mobile device 100 includes housing 102 that creates an internal volume for positioning and protecting a number of electronic components. Housing 102 can also take the form of multiple housing components that cooperate to define the internal volume for positioning and protecting the number of electronic components. Housing 102 may also include slot 106 for receiving SIM tray 700. In some embodiments, SIM tray assembly 700 can include external portion 702 and tray portion 704. Tray portion 704 can join to external portion 702 by utilizing a magnetic force. The magnetic force can be provided by magnets 706 embedded in external portion 702. The magnetic force can substantially limit movement of tray portion 704 and external portion 702 relative to each other in x and/or y directions. However, the magnetic force can allow the positions of tray portion 704 and external portion 702 to float relative to each other in z direction.

Figure 7B:
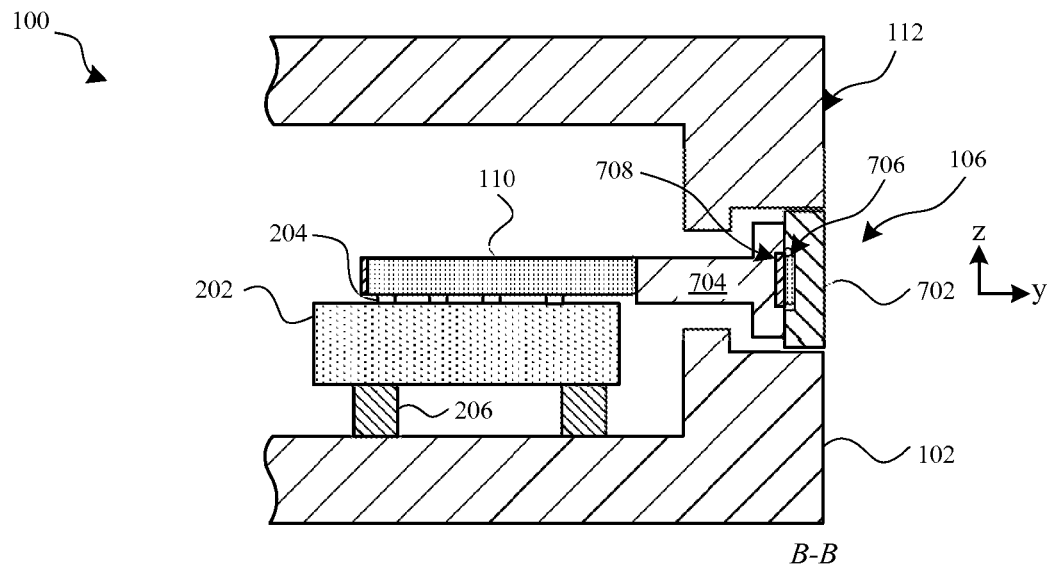
FIG. 7B shows a cross-sectional view of the mobile device in accordance with section line B-B of FIG. 7A with the SIM tray placed within a slot in a housing of the mobile device.

FIG. 7B shows a cross-sectional view of mobile device 100 in accordance with section line B-B of FIG. 7A with SIM tray 700 placed within slot 106 in housing 102 of mobile device 100. As depicted, SIM tray 700 is fully inserted within slot 106 forming the part of SIM tray 700 that is substantially flush or parallel to surface 112. Housing 102 can have chamfers that aid in positioning SIM tray 700 relative to housing 102 when inserted. Magnets 706 can be embedded in external portion 702. Magnets 706 can be attracted to tray portion 704. In other embodiments, tray portion 704 can also contain magnets 708. Magnets 706 and 708 can also be any pair of materials that are magnetically attracted to each other. For example, magnet 706 can be formed from ferromagnetic material and magnet 708 can be a rare earth magnet. In lieu of magnets 706, tray portion 704 can be formed from a ferromagnetic material such as steel. When inserted into mobile device 100, SIM tray 108 is positioned in such a manner that allows SIM card 110 positioned within the receptacle in SIM tray 700 to interact with electrical component 202 within mobile device 100. External portion 702 can be flush with surface 112. Electrical component 202 can be a main logic board (MLB). Standoffs 206 can support electrical component 202 on housing 102. SIM card 110 can then electrically interact with electrical component 202 through contacts 204. In the case where contacts 204 form a substantially flat surface, SIM tray 108 is positioned substantially parallel to electrical component 202 once inserted into mobile device 100. SIM tray 700 can remain substantially flush or parallel to surface 112 advantageously creating a desirable cosmetic appearance.

Figure 7C:
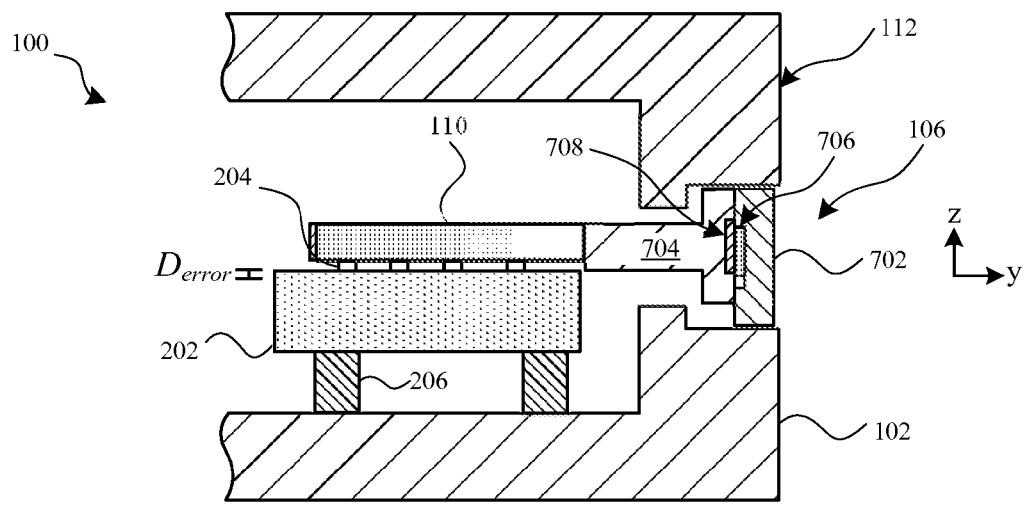
FIG. 7C shows a cross-sectional view of the mobile device in accordance with section line A-A of FIG. 1 where the mobile device is subjected to tolerance stacking.

To illustrate, FIG. 7C shows a cross-sectional view of mobile device 100 in accordance with section line A-A of FIG. 1 where device 100 is subjected to tolerance stacking. SIM tray assembly 700 can be utilized to accommodate tolerance stacking of internal components of mobile device 100. In this particular embodiment, housing 102, standoffs 206, and electrical component 202 can be manufactured components having dimensional errors. As a result of tolerance stacking phenomenon, SIM tray 700 can be moved by distance $D_{ERROR}$. However, rather than deforming, tray portion 704 can translate in z direction in order to accommodate tolerance stacking. In this way, tray portion 704 is not adversely affected by tolerance stacking and communication between SIM card 110 and electrical component 202 can be maintained. Additionally, external portion 702 can remain be flush with surface 112 thereby providing an aesthetically appealing exterior for mobile device. A lubricant or a coating that increases lubricity can facilitate movement of external portion 702 in the z axis. Additionally, magnets 706 and 708 can also facilitate relative movement between external portion 702 and tray portion 704 in both the z and x directions. In other embodiments, housing 102 can also include a number of magnets. For example, magnets 708 can be located on housing 102 rather than tray portion 704. In this case, magnets 708 and 706 can cooperate to allow translation in the z direction in order to accommodate tolerance stacking.

Figure 8:
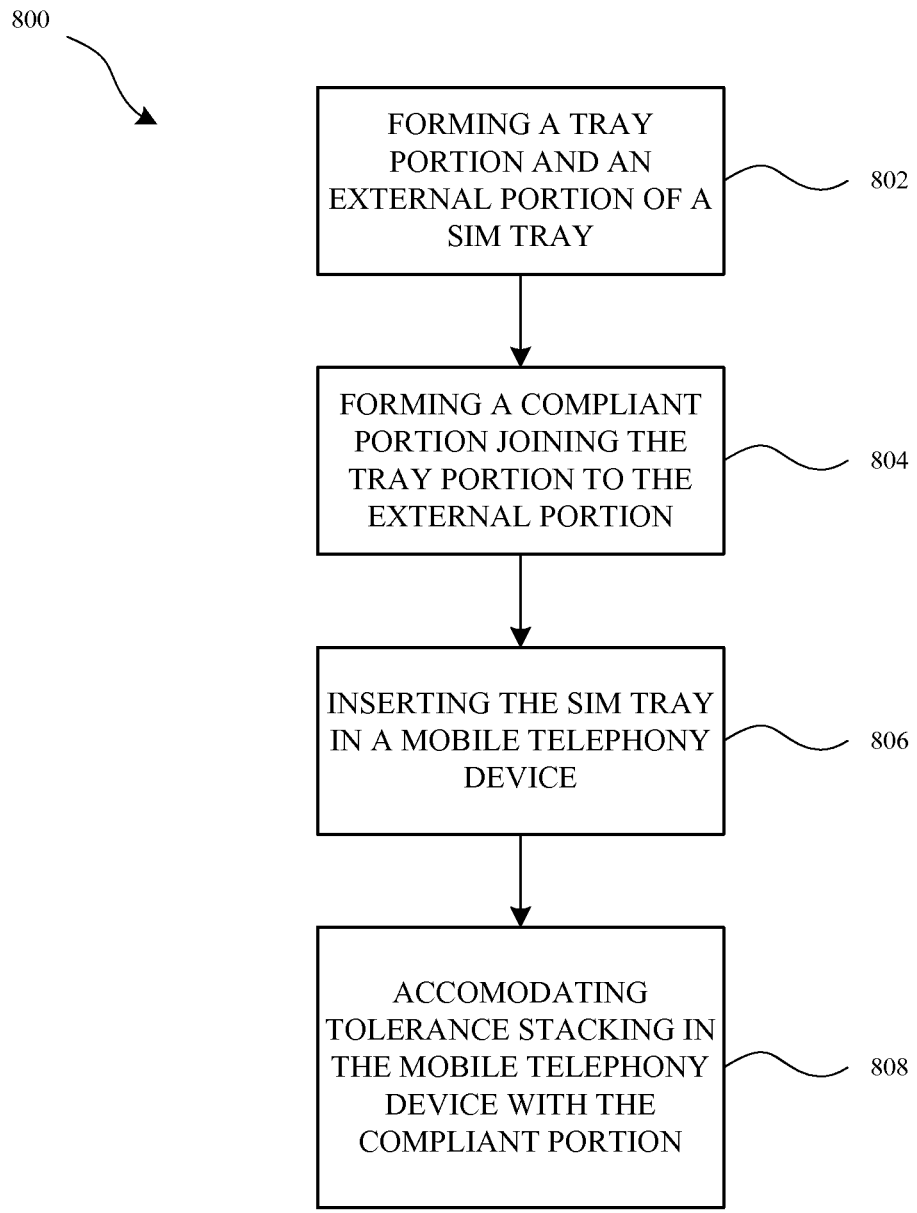
FIG. 8 shows a flow chart describing methods of manufacturing and utilizing the SIM tray.

FIG. 8 illustrates a flow chart depicting a method 800 for manufacturing and utilizing a SIM tray in accordance with an embodiment of the invention. As shown, method 800 begins at step 802, which involves forming a tray portion for housing and positioning a SIM card and an external portion for forming a substantially flush surface with a housing of a mobile telephony device. Step 804 forming a compliant portion joining the tray portion to the external portion. For example, the tray portion and the external portion can be connected with a compliant material formed from as rubber, an elastomeric polymer, or any material with a lower modulus of elasticity than the materials that form the external portion or the tray portion. In some embodiments, the compliant portion can take the form of a compliant join such as a dovetail joint. For example, the tray portion could form a protrusion that can be inserted into a channel located on the external portion. In other embodiments, the compliant portion could take the form of magnets. Step 806 involves inserting the SIM tray assembly into the mobile telephony device. Because of the tolerance stacking phenomenon, the SIM tray could be subjected to a force. In step 808, the compliant portion can allow the external portion to remain flush with the housing of the mobile device. In some embodiments, the compliant portion can deform (strain) by a greater magnitude than the tray portion and/or the external portion. In other embodiments, compliant portion can allow the tray portion and the external portion to translate in a direction.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A subscriber identification module (SIM) tray assembly suitable for use with a portable electronic device having a housing, the SIM tray assembly comprising:
    an external portion having an externally facing wall, the external portion capable of being received in a SIM slot opening of the housing;
    a tray portion having a body comprising an opening having a recessed supporting feature configured to support a SIM card; and
    a magnetic interface that attaches together the external portion and the tray portion wherein when the external portion and the tray portion are installed in the portable electronic device, the magnetic interface maintains the externally facing wall flush with an exterior surface of the housing regardless of movement of the tray portion within the housing.

2. The SIM tray assembly of claim 1, wherein the tray portion comprises interlocking features that couple to interlocking features of the tray portion to limit movement of the external portion with respect to the tray portion to a first direction.

3. The SIM tray assembly of claim 2, wherein the interlocking features of the tray portion and the external portion limit the direction of movement of the external portion with respect to the tray portion to a single direction.

4. The SIM tray assembly of claim 1, wherein the external portion comprises magnetic elements and the tray portion is formed of a magnetically attractable material.

5. A subscriber identification module (SIM) tray assembly, comprising:
    an external portion configured to cover a SIM slot of a mobile device;
    a tray portion comprising an opening having a recessed supporting feature configured to support a SIM card; and
    an magnetic interface between the external portion and the tray portion, the interface configured to constrain relative movement between the external portion and the tray portion in a first direction and facilitate movement between the external portion and the tray portion in a second direction different from the first direction.

6. The SIM tray assembly of claim 5, wherein the interface comprises one or more protrusions that interlock with one or more channels.

7. The SIM tray assembly of claim 5, wherein the interface further comprises:
    a channel defined by an interior facing surface of the external portion; and
    a protrusion integrally formed with the tray portion and trapped within the channel, wherein the channel is oriented along the second direction and allows movement of the external portion with respect to the tray portion in the second direction.

8. The SIM tray assembly of claim 5, wherein the magnetic interface comprises:
    a first group of magnetic elements integrated in the external portion; and
    a second group of magnetic elements integrated in an area of the tray portion proximate to the external portion, wherein the first and second groups of magnetic elements are magnetically attracted to each other.

9. The SIM tray assembly of claim 8, wherein the first and second groups of magnetic elements are formed from ferromagnetic material.

10. The SIM tray assembly of claim 8, wherein at least a portion of the first and second groups of magnetic elements are rare earth element magnets.

11. A mobile device, comprising:
    a housing defining an interior volume;
    a slot formed in the housing that facilitates access to the interior volume from the exterior of the housing;
    an electrical component disposed within the interior volume, the electrical component comprising a plurality of electrical contacts; and
    a subscriber identification module (SIM) tray assembly inserted into the slot so that a SIM card supported by the SIM tray assembly contacts the plurality of electrical contacts, the SIM tray assembly comprising:
        an external portion that covers the slot, the external portion comprising magnetic material,
        a tray portion having a SIM card opening that has a recessed supporting feature that supports the SIM card, the tray portion comprising magnetic material, and
        a magnetic interface where the magnetic material of the external portion interacts with the magnetic material of the tray portion to couple together the external portion and the tray portion such that the external portion remains flush with an exterior surface of the housing regardless of movement of the tray portion at the interior volume of the housing.

12. The mobile device of claim 11, wherein the housing comprises chamfered features that help guide the SIM tray assembly.

13. The mobile device of claim 11, wherein the electrical component is supported by standoffs that support the electrical component above an internal surface of the housing.

14. The mobile device of claim 13, wherein manufacturing tolerances resulting from the manufacture of the standoffs, the electrical component and the housing all cooperate to generate the movement of the tray portion in the slot.

15. The mobile device of claim 11, wherein the movement of the tray portion in the slot is caused by tolerance stacking of components internal to the mobile device.

16. The mobile device of claim 11, wherein the magnetic interface comprises one or more tapered protrusions integrally formed with the tray portion that interlock with one or more channels defined by an interior facing surface of the external portion of the SIM tray assembly.

17. The mobile device of claim 11, wherein the magnetic material of the tray portion and the external portion each comprises a magnet.

18. The mobile device of claim 11, wherein the tray portion is formed of a magnetically attractable metal and the external portion comprises an array of magnets.

\* \* \* \* \*